Patented Nov. 25, 1952

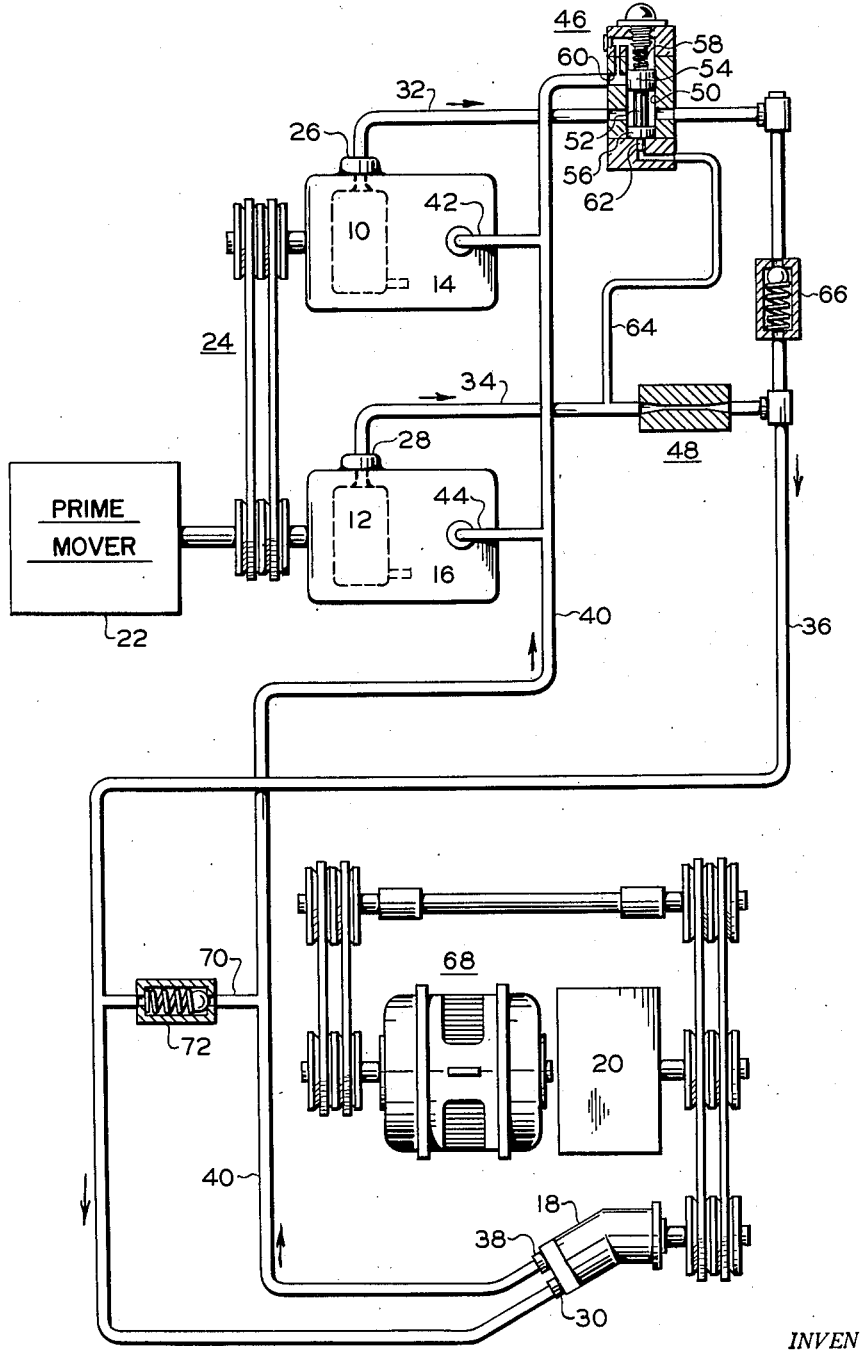

2,618,932

UNITED STATES PATENT OFFICE 2,618,932

PUMP AND MOTOR HYDRAULIC SYSTEM, INCLUDING MULTIPLE PUMPS

Milton J. Taup, La Grange, Ill., assignor to Vickers Incorporated, Detroit, Mich., a corporation of Michigan Application September 9, 1949, Serial No. 114,707

6 Claims. (Cl. 60—53)

This invention relates to power transmissions, and is particularly applicable to those of the type comprising two or more fluid pressure energy translating devices, one of which may function as a pump and another as a fluid motor.

The invention is more particularly concerned with a power transmission system for driving a load device requiring a substantially narrow speed range drive from a prime mover which operates over a substantially wider speed range.

Transmissions of this type may be utilized, for example, for operating certain types of motor vehicle refrigerator systems. In the past, hydraulic transmissions have been utilized for vehicle refrigerating systems which maintain a substantially constant output speed of a fluid motor driving a compressor when operated by a pump driven at wide output speeds. However, because of the complexity of some of these systems and the cost of incorporating variable displacement fluid pumps or motors therein, they have not been utilized to their fullest extent.

According to the present invention the compressor need not be operated at a substantially constant speed, but the system may be operated efficiently if the compressor is driven over a narrow speed range. The invention is applicable whenever a narrow speed range of a fluid motor driving a load device is desirable and wherein the power input source for driving the pressure fluid source pumping mechanism has a substantially wider speed range than the desired narrow speed range of the fluid motor. The invention materially decreases the relative cost of hydraulic transmissions for motor vehicle refrigerating systems by making it unnecessary to utilize variable displacement pumping or motor units and by incorporating in the system positive displacement pumping and motor units and low cost, hydraulic control mechanism.

It is therefore an object of this invention to provide a hydraulic transmission wherein the speed of a positive displacement fluid motor is confined within a narrow speed range although the motor is energized by a pair of positive displacement pumps driven by a variable prime mover having a substantially wider speed range than the desired speed range of the motor.

It is still another object of the present invention to provide a hydraulic power transmission system having two positive displacement fluid pumps driven by a variable speed prime mover which are connected to a positive displacement fluid motor, and incorporating control means which at low speeds of the prime mover connects both pumps to the motor and at higher speeds connects only one of said pumps to the motor.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system incorporating a preferred form of the present invention.

Referring now to the drawing there is shown a pair of positive displacement pumping units 10 and 12 mounted, respectively, within tanks 14 and 16, and which supply pressure fluid for driving a positive displacement fluid motor 18, the latter of which is illustrated for purposes of convenience as operating by a conventional belt driven connection, a compressor 20 of a vehicle refrigerating system, not shown. The pumping units 10 and 12 may be driven in unison from a power take-off of the engine of the vehicle which is indicated generally by the numeral 22, associated with which is a suitable shaft and belt driven connection indicated by the numeral 24.

A pressure delivery outlet 26 of the pumping unit 10 and a pressure delivery outlet 28 of the pumping unit 12 are respectively connected in parallel to an inlet 30 of the fluid motor 18 by means of pressure delivery conduits 32 and 34 connected to a main pressure delivery conduit 36 leading to the inlet 30 of the motor 18. An outlet 38 of the motor 18 is connected to the tanks 14 and 16 by means of a tank conduit 40 and branch conduits 42 and 44.

Due to the fact that the speed of the fluid motor 18 would be greatly increased at high speeds of the engine if the combined increased flow delivery rate of the pumps 10 and 12 were delivered to the motor 18, the transmission is arranged so that one of the pumps may be disconnected from the motor to prevent this condition. A pressure responsive by-pass control valve 46 in the conduit 32, which is connected to the pressure delivery outlet 26 of the pumping unit 10, normally permits delivery of pressure fluid from pumping unit 10 to the fluid motor 18. However, the control valve 46 is responsive to predetermined increases in pressure in the pressure delivery conduit 34 of the pumping unit 12, caused by a restriction or throttle 48 in the conduit 34, said restriction controlling the flow rate in the conduit.

The pressure delivery conduit 32 of pumping unit 10 is directly connected to an inlet chamber 50 of the control valve 46 and within which is shiftably mounted a piston 52 having balanced lands 54 and 56, the opposing surfaces of which are exposed to pressure in the inlet chamber. The piston 52 is normally biased to the position shown by a spring 58 of predetermined resistance so that land 54 blocks communication between the inlet chamber 50 and a by-pass passage 60, the latter of which is connected to the tank return line 40. A smaller piston 62 in the lower portion of the valve 46 is connected by conduit 64 to the pressure delivery conduit 34 of the pumping unit 12 ahead of the restriction or throttle for operating the main piston 52. Suitable means may be provided for adjusting the resistance of the spring 58 to cooperate with the throttle 48 in such a manner that at predetermined speeds of the engine of the vehicle the throttle 48 creates a resistance to the increased flow rate of the pumping unit 12, thus causing a pressure increase acting on the small piston 62 and overcoming the resistance of the spring 58. A check valve 66 permits free fluid flow from the pumping unit 10 to the main delivery conduit 36, but prevents fluid flow from the pumping unit 12 to the by-pass control valve 46 and pump unit 10.

Suitable means for standby operation of the compressor 20 is provided by an electric motor 68 mechanically coupled to the compressor 20. During standby operation of the compressor 20 by the electric motor 68, the fluid motor 18 will be driven as a pump and the displacement therefrom through conduit 40 is continually by-passed to the inlet 30 of the motor 18 by means of a branch conduit 70 connecting the motor conduits 36 and 40. A check valve 72 is incorporated in the conduit 70 to permit the motor to be operated as a pump during standby operation but which prevents flow in the main delivery conduit 36 from entering the wrong side of the motor during normal operation.

In operation, with the pumps 10 and 12 being driven at low speeds from the prime mover or power input source 22, the combined displacement of the pumps 10 and 12 will be delivered by conduits 32 and 34 to the main pressure delivery conduit 36 and thence to the inlet 30 of the motor 18. Fluid displacement from the motor 18 will be delivered to the tanks 14 and 16 by means of outlet port 38, conduit 40, and branch condits 42 and 44. At low speeds of the prime mover 22 the parts of the control valve 46 will be in the position shown. Due to the fact that the pumps and the motor are positive displacement units, the speed of the motor is dependent upon its own displacement and the rate at which fluid is delivered thereto from the pumping units 10 and 12. The displacement per unit of time of the pumps increases with increased speed of the prime mover 22 driving the same, so as to increase the speed of the motor. In order to confine the speed of the fluid motor 18 to a much narrower speed range than that of the prime mover 22, fluid displacement from the pump 10 is by-passed when the speed of the prime mover 22 reaches a predetermined speed. Thus, vehicle engine speed may increase still further, but due to the fact that the displacement of only one pump is delivered to the motor, the speed thereof will be confined within a much narrower speed range than the speed range of the variable speed prime mover.

When the flow rate from the pump 12 has been increased to a certain critical value so that the resistance of throttle 48 creates a pressure ahead of the throttle great enough to operate the small piston 62 of control valve 46, piston 52 will be shifted upwardly and the inlet chamber 50 is now connected to the by-pass passage 60. Displacement from the pump 10 will now be by-passed to the conduit 40 and tank 14 by means of conduit 32 and inlet chamber 50 and by-pass passage 60. So long as the speed of the prime mover 22 is such as to drive the pump 12 at a speed to produce a flow rate above this critical value, the pressure at the pressure delivery outlet of pump 12 ahead of the throttle 48 will be high enough to maintain the control valve 46 in the by-pass position. When the speed of the prime mover 22 is reduced below the critical value the flow rate is such that the throttle 48 no longer offers a resistance great enough to cause a pressure sufficient to operate the control valve 46 to by-pass the displacement of pump 10. In such case, the combined displacement of the pumps is delivered to the motor 18 to operate the same. The throttle 48 and control valve 46 coact as a hydraulic governor in that the throttle senses increases and decreases of speed of the prime mover and causes increases and decreases of pressure to operate the control valve, the latter of which causes operation of the fluid motor by both pumps at low engine speeds and by a single pump at predetermined higher speeds.

The invention thus provides an improved, economical means of keeping the speed range of the fluid motor within a much narrower range than the speed range of the power input source. The invention provides this result by the use of any conventional positive displacement fluid pumps and motor and the addition of any suitable conventional pressure responsive by-pass valve and restriction or throttle incorporated in the system to coact and cooperate as described. As previously stated, the throttle cooperates with the pressure responsive by-pass valve to give this result, and either or both may be adjusted to fit the requirements of a wide variety of motor speed requirements.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a positive displacement fluid motor, a plurality of positive displacement fluid pumps mechanically coupled to a variable speed, prime mover, a separate pressure delivery conduit leading from each pump to a main pressure delivery conduit leading to the motor, a by-pass valve in the delivery conduit of one of said pumps and normally biased to the closed position, said valve including operating means responsive to predetermined pressure increases for actuating the valve to the open position and by-passing the complete delivery of said one pump, a branch conduit connected to the delivery conduit of another one of said pumps and leading to the valve operating means, and a restriction in the delivery conduit of said other pump causing increases in pressure in said delivery conduit at predetermined increases in speed of the prime mover, said pressure increases being transmitted through the branch conduit to the valve operating means for actuating the valve to the open position.

2. In a hydraulic power transmission system the combination of a positive displacement fluid motor, a pair of positive displacement fluid pumps mechanically coupled to a variable speed, prime mover, a separate pressure delivery conduit leading from each pump to a main pressure delivery conduit leading to the motor, a by-pass valve in the delivery conduit of one of said pumps and normally biased to the closed position, said valve including operating means responsive to predetermined pressure increases for actuating the valve to the open position and by-passing the complete delivery of said one pump, a branch conduit connected to the delivery conduit of the other pump and leading to the valve operating means, and a restriction in the delivery conduit of said other pump causing increases in pressure in said delivery conduit at predetermined increases in speed of the prime mover, said pressure increases being transmitted through the branch conduit to the valve operating means for actuating the valve to the open position.

3. In a hydraulic power transmission system the combination of a plurality of positive displacement pumps mechanically coupled to a variable speed, prime mover, a delivery conduit for each pump each of which leads to a main delivery conduit, a positive displacement motor connected to the main delivery conduit for driving a load device at a substantially lower range of speed than the range of speed of the prime mover, a by-pass for the delivery conduit of one of said pumps, and hydraulic governor means for controlling the by-pass, said means comprising a valve normally closing the by-pass and responsive to predetermined pressure increases in the delivery conduit of another one of said pumps to open the by-pass and completely by-pass the delivery of said one pump, and a restriction in the delivery conduit of said other pump for causing predetermined pressure increases in said conduit sufficient to operate the valve to the open position at predetermined increases in speed of the prime mover.

4. In a hydraulic power transmission system the combination of a pair of positive displacement pumps mechanically coupled to a variable speed, prime mover, a delivery conduit for each pump each of which leads to a main delivery conduit, a positive displacement motor connected to the main delivery conduit for driving a load device at a substantially lower range of speed than the range of speed of the prime mover, a by-pass for the delivery conduit of one of said pumps, and hydraulic governor means for controlling the by-pass, said means comprising a valve normally closing the by-pass and responsive to predetermined pressure increases in the delivery conduit of the other one of said pumps to open the by-pass and completely by-pass the delivery of said one pump, and a restriction in the delivery conduit of said other pump for causing predetermined pressure increases in said conduit sufficient to operate the valve to the open position at predetermined increases in speed of the prime mover.

5. In a hydraulic power transmission system the combination of a positive displacement fluid motor, a plurality of positive displacement fluid pumps mechanically coupled to a variable speed, prime mover, a separate pressure delivery conduit leading from each pump to a main pressure delivery conduit leading to the motor, a by-pass valve in the delivery conduit of one of said pumps and normally biased to the closed position, said valve including operating means responsive to predetermined pressure increases for actuating the valve to the open position and by-passing the complete delivery of said one pump, a branch conduit connected to the delivery conduit of another one of said pumps and leading to the valve operating means, a restriction located in the delivery conduit of said other pump beyond where the branch conduit is connected to said delivery conduit, the restriction causing predetermined increases in pressure in said delivery conduit ahead of the restriction at predetermined increases in speed of the prime mover for transmittal through the branch conduit to actuate the valve to the open position, and a check valve in the delivery conduit having the by-pass valve located beyond said by-pass valve.

6. In a hydraulic power transmission system the combination of a positive displacement fluid motor, a pair of positive displacement fluid pumps mechanically coupled to a variable speed, prime mover, a separate pressure delivery conduit leading from each pump to a main pressure delivery conduit leading to the motor, a by-pass valve in the delivery conduit of one of said pumps and normally biased to the closed position, said valve including operating means responsive to predetermined pressure increases for actuating the valve to the open position and by-passing the complete delivery of said one pump, a branch conduit connected to the delivery conduit of the other pump and leading to the valve operating means, a restriction located in the delivery conduit of said other pump beyond where the branch conduit is connected to said delivery conduit, the restriction causing predetermined increases in pressure in said delivery conduit ahead of the restriction at predetermined increases in speed of the prime mover for transmittal through the branch conduit to actuate the valve to the open position, and a check valve in the delivery conduit having the by-pass valve located beyond said by-pass valve.

MILTON J. TAUP.

REFERENCES CITED

The following references are of record in the file of this patent:

UNITED STATES PATENTS

| Number | Name | Date |
| --- | --- | --- |
| 1,318,143 | Haffner | Oct. 7, 1919 |
| 1,982,711 | Vickers | Dec. 4, 1934 |
| 2,074,618 | Roeder | Mar. 23, 1937 |
| 2,102,865 | Vickers | Dec. 21, 1937 |
| 2,255,783 | Kendrick | Sept. 16, 1941 |
| 2,272,684 | Vickers | Feb. 10, 1942 |